United States Patent
Harris et al.

(10) Patent No.: US 10,683,764 B2
(45) Date of Patent: Jun. 16, 2020

(54) MODIFIED ATMOSPHERE MELT INFILTRATION

(71) Applicants: Rolls-Royce High Temperature Composites, Inc., Cypress, CA (US); Rolls-Royce Corporation, Indianapolis, IN (US)

(72) Inventors: Stephen I. Harris, Long Beach, CA (US); Robert J. Shinavski, Mission Viejo, CA (US); Richard W. Kidd, Rancho Palos Verdes, CA (US); Sungbo Shim, Irvine, CA (US); Kang N. Lee, Strongsville, OH (US)

(73) Assignees: Rolls-Royce Corporation, Indianapolis, IN (US); Rolls-Royce High Temperature Composites, Inc., Cypress, CA (US)

( * ) Notice: Subject to any disclaimer, the term of this patent is extended or adjusted under 35 U.S.C. 154(b) by 191 days.

(21) Appl. No.: 15/896,557

(22) Filed: Feb. 14, 2018

(65) Prior Publication Data

US 2018/0187560 A1    Jul. 5, 2018

Related U.S. Application Data

(62) Division of application No. 15/040,527, filed on Feb. 10, 2016, now abandoned.
(Continued)

(51) Int. Cl.
*F01D 5/28* (2006.01)
*C04B 35/80* (2006.01)
(Continued)

(52) U.S. Cl.
CPC ............ *F01D 5/284* (2013.01); *C04B 35/573* (2013.01); *C04B 35/62863* (2013.01); *C04B 35/62868* (2013.01); *C04B 35/62894* (2013.01); *C04B 35/806* (2013.01); *C04B 41/009* (2013.01); *C04B 41/5059* (2013.01); *C04B 41/5096* (2013.01); *C04B 41/52* (2013.01); *C04B 41/89* (2013.01); *F01D 5/282* (2013.01); *F01D 5/288* (2013.01); *F01D 11/122* (2013.01); *C04B 2235/3826* (2013.01); *C04B 2235/5276* (2013.01); *C04B 2235/614* (2013.01); *C04B 2235/616* (2013.01); *F05D 2240/11* (2013.01); *F05D 2300/222* (2013.01);
(Continued)

(58) Field of Classification Search
CPC ................. F01D 5/284; C04B 41/4582; C04B 35/62868; C04B 35/806
See application file for complete search history.

(56) References Cited

U.S. PATENT DOCUMENTS 3,925,577 A    12/1975    Fatzer et al.
4,028,149 A    6/1977    Deines et al.
(Continued)

OTHER PUBLICATIONS

Prosecution History from U.S. Appl. No. 15/040,527, dated Feb. 9, 2017 through Nov. 30, 2017, 42 pp.

*Primary Examiner* — Jessee R Roe
(74) *Attorney, Agent, or Firm* — Shumaker & Sieffert, P.A.

(57) ABSTRACT

A ceramic matrix composite component for use in a gas turbine engine and method for making the same are described herein. The component includes a body and an outer region. The body includes a silicon containing ceramic composite. The outer region is on an outer surface of the body.

17 Claims, 4 Drawing Sheets

Related U.S. Application Data

(60) Provisional application No. 62/114,913, filed on Feb. 11, 2015.

(51) Int. Cl.
  *F01D 11/12* (2006.01)
  *C04B 35/628* (2006.01)
  *C04B 41/89* (2006.01)
  *C04B 41/00* (2006.01)
  *C04B 41/52* (2006.01)
  *C04B 35/573* (2006.01)
  *C04B 41/50* (2006.01)

(52) U.S. Cl.
  CPC ............... *F05D 2300/2261* (2013.01); *F05D 2300/6032* (2013.01); *F05D 2300/6033* (2013.01)

(56) References Cited

U.S. PATENT DOCUMENTS

| | | |
|---|---|---|
| 4,123,571 A | 10/1978 | Balog et al. |
| 4,456,634 A | 6/1984 | Galasso et al. |
| 4,851,375 A | 7/1989 | Newkirk et al. |
| 4,885,199 A | 12/1989 | Corbin et al. |
| 5,205,970 A | 4/1993 | Brun et al. |
| 5,306,676 A | 4/1994 | Johnson |
| 5,324,494 A | 6/1994 | Glatzmaier |
| 5,419,927 A | 5/1995 | Dietrich |
| 5,435,889 A | 7/1995 | Dietrich |
| 5,571,758 A | 11/1996 | Grossman |
| 5,658,710 A | 8/1997 | Neukermans |
| 5,707,471 A | 1/1998 | Petrak et al. |
| 6,299,988 B1 | 10/2001 | Wang et al. |
| 6,358,565 B1 | 3/2002 | Krenkel et al. |
| 6,749,937 B2 | 6/2004 | Gray |
| 6,902,836 B2 | 6/2005 | Eaton et al. |
| 7,402,347 B2 | 7/2008 | Morrison et al. |
| 8,124,252 B2 | 2/2012 | Cybulsky et al. |
| 9,341,412 B2 | 5/2016 | Luthra |
| 2013/0052472 A1 | 2/2013 | Xu |
| 2014/0165419 A1* | 6/2014 | Luthra .................. C04B 41/009 34/467 |
| 2016/0230570 A1 | 8/2016 | Harris et al. |

\* cited by examiner

MODIFIED ATMOSPHERE MELT INFILTRATION

CROSS REFERENCE TO RELATED APPLICATIONS

This application is a divisional of U.S. application Ser. No. 15/040,527, now abandoned, filed Feb. 10, 2016, which claims the benefit of U.S. Provisional Patent Application No. 62/114,913, filed Feb. 11, 2015. The entire contents of U.S. application Ser. No. 15/040,527 and U.S. Provisional Patent Application Number 62,114,913 are incorporated herein by reference.

FIELD OF THE DISCLOSURE

The present disclosure relates generally to gas turbine engines, and more specifically to ceramic matrix composite components.

BACKGROUND

Gas turbine engine components are exposed to high temperature environments with an increasing demand for even higher temperatures. Economic and environmental concerns relating to the reduction of emissions and the increase of efficiency are driving the demand for higher gas turbine operating temperatures. In order to meet these demands, temperature capability of the components in hot sections such as blades, vanes, blade tracks, seal segments and combustor liners may be increased.

Ceramic matrix composites (CMCs) may be a candidate for inclusion in the hot sections where higher gas turbine engine operating temperatures are required. One benefit of CMC engine components is the high-temperature mechanical, physical, and chemical properties of the CMCs which allow the gas turbine engines to operate at higher temperatures than current engines.

One possible method of manufacturing dense CMC bodies may include infiltration of a porous, rigidized fiber preform. The method may involve the infiltration of silicon carbide (SiC) particulate filled slurry. The silicon carbide from the slurry may reduce the volume fraction of remaining porosity. Liquid silicon may then be infiltrated into the remaining porosity to form a dense CMC body.

SUMMARY

The present disclosure may comprise one or more of the following features and combinations thereof.

According to an aspect of the present disclosure, a ceramic matrix composite component for use in a gas turbine engine is taught. The component may comprise a body and an outer region. The body may comprise a silicon containing ceramic composite and an outer region on an outer surface of the body. The outer region may comprise whiskers embedded in a matrix. The whiskers may comprise silicon carbide, and the matrix may comprise a majority of silicon metal.

In some embodiments the outer region may further comprise precipitates selected from a group consisting of iron-rich silicides, silicon borides, and any combination thereof. The outer region may have a substantially flat external surface.

In some embodiments the ceramic composite of the body is a silicon carbide-silicon carbide composite. In some embodiments the whiskers may have a diameter of between about 0.5 μm and about 25 μm. In some embodiments the outer may have a thickness of between about 5 μm and about 300 μm.

In some embodiment the matrix may consist essentially of silicon metal. The silicon metal of the outer region may be wetted to the silicon carbide whiskers.

In some embodiments, the component may further comprise an environmental barrier coating selected from a group consisting of mullite, barium strontinum aluminosilicate, strontinum aluminosilicate, barium aluminosilicate, rare earth di silicates, rare earth monosilicate, and any combination thereof. An abradable may be bonded to the environmental barrier coating such that the environmental barrier may be sandwiched between the ceramic matrix composite component and the abradable coating. The abradable may be selected from a group consisting of barium strontinum aluminosilicate, strontinum aluminosilicate, barium aluminosilicate, rare earth disilicates, rare earth monosilicates, and combinations thereof.

According to another aspect of the present disclosure an in situ method for forming a silicon rich outer region along a ceramic matrix composite component for use in a gas turbine engine is taught. The method may comprise melt infiltrating a silicon metal or alloy into a ceramic preform to form a body, cooling the component after the melt infiltrating, adding hydrocarbon gas to an atmosphere in contact with the body during at least a portion of the melt infiltrating, the cooling or any combination thereof; and chemically reacting the hydrocarbon gas with silicon in the body to form silicon carbide on an outer region of the body.

In some embodiments the silicon carbide on the outer region of the body may comprise whiskers. In some embodiments the method may further comprise wetting a silicon metal or alloy, formed from silicon of the body, to the whiskers to form the outer region. The outer region may have a silicon concentration greater than a silicon concentration of the body.

In some embodiments the hydrocarbon gas may be selected from a group consisting of methane, propane, or a combination thereof. The method may further comprise adding hydrogen gas to the step of adding hydrocarbon gas in a ratio of hydrocarbon gas to hydrogen gas of between about 4:1 and about 1:20.

In some embodiments the method may further comprise depositing an environmental barrier coating along the external surface of an outer region. The method may further comprise depositing a porous abradable such that the environmental barrier coating may be sandwiched between the outer region of the body and the abradable.

In some embodiments the method may further comprise adding a catalyst comprising nickel, molybdenum, cobalt, or any combination thereof during the step of melt infiltration.

These and other features of the present disclosure will become more apparent from the following description of the illustrative embodiments.

DETAILED DESCRIPTION OF THE DRAWINGS

Figure 1:
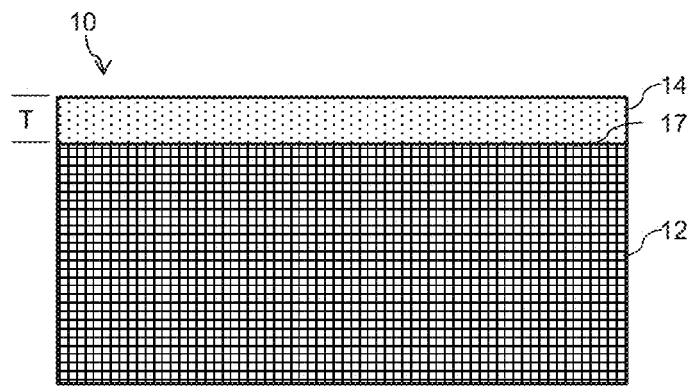
FIG. 1 is a schematic of a SiC—SiC CMC body that includes an in situ grown outer region.

For the purposes of promoting an understanding of the principles of the disclosure, reference will now be made to a number of illustrative embodiments illustrated in the drawings and specific language will be used to describe the same.

FIG. 1 is an illustrative component 10 adapted for use in a gas turbine engine. The component 10 may include a body 12 and an outer region 14 along an outer surface 17 of the body 12. The outer region 14 may include a substantially uniform and/or flat outer surface 17 for depositing additional layers. The component 10 may be a component of a high temperature mechanical system. For example, component 12 may be a seal segment, a blade, a vane, a combustion liner, or any other CMC component used within a gas turbine engine.

Figure 4:
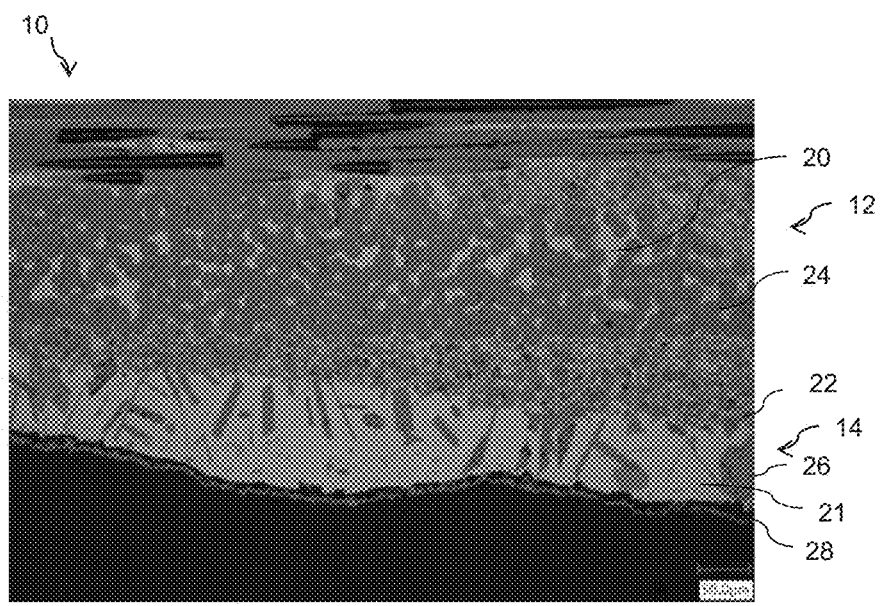
FIG. 4 is a cross-sectional micrograph of a SiC—SiC CMC that has an in-situ grown outer region formed after exposure to a modified melt infiltration environment.
Figure 5:
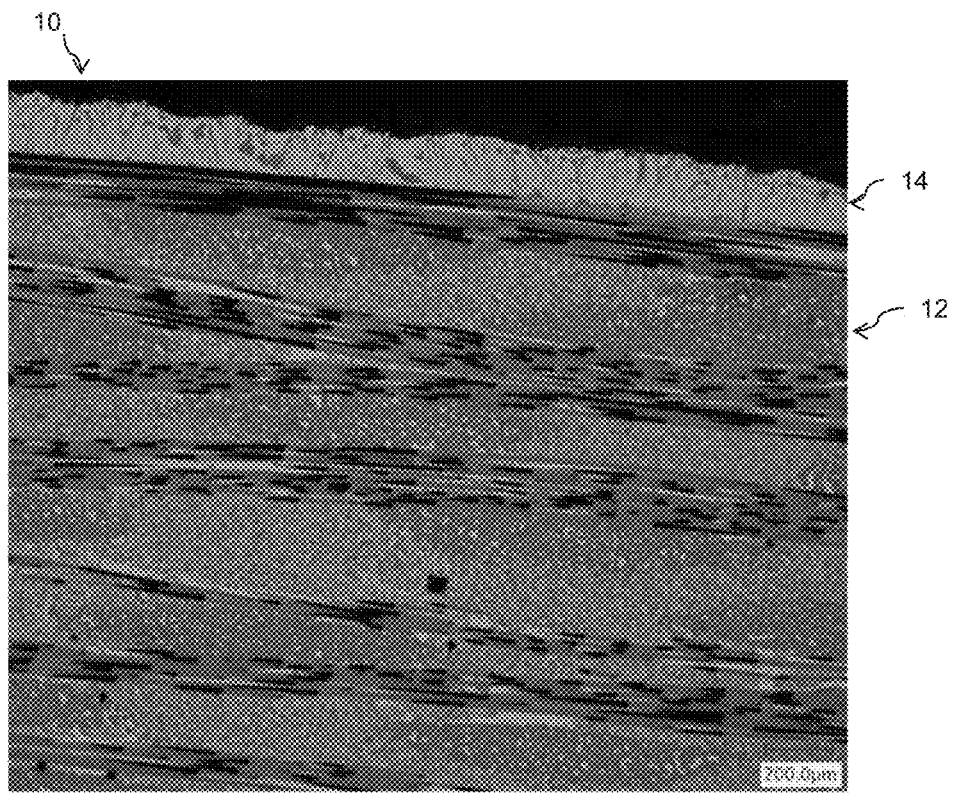
FIG. 5 is a cross-sectional micrograph of a section with a thinner, more consistent external surface after exposure to a modified melt infiltration environment.

FIGS. 4 and 5 are cross-sectional micrographs of sample components 10. The body 12 of the component 10 may include matrix material 20 and reinforcement material 24. The body 12 of the component 10 may include a silicon containing ceramic composite. The ceramic may be substantially homogenous. In some examples, body 12 may include a ceramic such as a Si-containing ceramic such as silicon carbide (SiC) or silicon nitride ($Si_3N_4$); boron carbide ($B_4C$), zirconium diboride ($ZrB_2$), molybdenum carbide ($Mo_2C$) or the like. In other examples, body 12 may include a metal silicide that includes silicon, such as a molybdenum-silicon alloy (e.g., $MoSi_2$) or a niobium-silicon alloy (e.g., $NbSi_2$).

In examples in which body 12 includes a CMC, the body 12 may include a matrix material 20 and a reinforcement material. The matrix material 20 may include a ceramic material such as SiC, $Si_3N_4$, $B_4C$, $ZrB_2$, $Mo_2C$ or the like. The CMC further may include a continuous or discontinuous reinforcement material. In some examples, the reinforcement material may include a continuous monofilament or multifilament weave. The reinforcement material may include SiC, $Si_3N_4$, or the like.

The body 12 may be fabricated by first forming a preform of ceramic fibers 24. Chemical vapor infiltration (CVI) may be used to build up one or more layers onto the ceramic fibers 24. For example, silicon carbide may be deposited onto the ceramic fibers 24. Furthermore, an intermediate layer such as boron nitride may be deposited prior to the silicon carbide layer. A slurry may then be infiltrated into the preform. The slurry may include particles of carbon and/or silicon carbide. After slurry infiltration, the preform may be infiltrated with molten silicon metal. The silicon metal and carbon may form silicon carbide to create a silicon carbide matrix 20 between the ceramic fibers 24 resulting in a dense CMC component 10.

As shown in FIG. 1, the component 10 includes an outer region 14 on an outer surface of the body 12. As shown in FIGS. 4 and 5, the outer region 14 may be adjacent to and/or in contact with the body 12. The outer region 14 may be an in situ grown silicon bond coat layer. The outer region 14 may be formed during the melt infiltration process. The outer region 14 may include a matrix material and SiC particles and/or whiskers 26 within a matrix 21. As shown by T in FIGS. 1-3, the outer region 14 may be between about 5 μm and about 300 μm thick.

The matrix 21 of the outer region 14 may include residual silicon, such as for example, silicon metal. In other examples, the outer region 14 may include a mixture of silicon and at least one of a transition metal carbide, a transition metal boride, or a transition metal nitride. The residual silicon in the outer region 14 may include between about 40 volume percent (vol. %) and about 99 vol. % silicon and a balance of the at least one of a transition metal carbide or a transition metal boride. For example, outer region 14 may include between 1 vol. % and about 60 vol. % of the at least one of a transition metal carbide, a transition metal boride, or a transition metal nitride, and a balance silicon an any additional constituents (such as silicon carbide).

As shown in FIG. 4, the outer region 14 may include precipitates 22 such as silicon carbide or other transition metal carbides, and/or contaminants. The contaminants may include iron, nickel, molybdenum, cobalt, or any combination thereof. For example, iron elements may be contaminants introduced during slurry and melt infiltration of the component 10. Without being bound by theory, the contaminants may act as a catalyst to assist in the formation of whiskers 26.

The whiskers 26 of the outer region 14 may include silicon carbide. In some examples, the whiskers 26 may include SiC, $Si_3N_4$, or the like. The whiskers 26 may be continuous or discontinuous within the outer region 14. The whiskers 26 may have a large length to diameter ratio. Furthermore, the whiskers 26 may be spaced from one another such that a microcapillary effect is created that may increase silicon layer growth. The whiskers 26 may include a diameter of between about 0.5 μm and about 25 μm. In some examples, the whiskers 26 may grow out of the matrix material. In other examples, the whiskers 26 may be embedded in the matrix material 20. Without being bound by theory, the whiskers 26 may nucleate and/or grow from the precipitates 22. In one embodiment, carbon whiskers 26 may be grown in-situ on the exterior or external surface 28 of the outer region 14 of the body 12 through the incorporation of a hydrocarbon gas during melt infiltration. These whiskers may react with the silicon containing melt alloy to form silicon carbide.

As shown in FIG. 4, the whiskers 26 may increase wettability of the outer region 14 which can result in a substantially uniform or consistent thickness of the outer region 14 by distributing the matrix 21 uniformly over the body 12. As a further result, the outer region 14 may have a substantially uniform and/or flat external surface 28, as shown in FIG. 4. The silicon metal or alloy of the matrix 20 of the outer region 14 may be wetted to the silicon carbide whiskers 26. Wetting may be the ability for a liquid to maintain contact with a solid surface and may be important in the bonding of two materials. The degree of wetting may be determined by a force balance between cohesive and adhesive forces. The wetting angle of silicon on carbon is less than that of silicon carbide thus the adhesive forces may be greater which may promote capillary wicking of the molten silicon metal infiltrant through the whisker structure.

The substantially uniform or consistently flat external surface 28, of the outer region 14 may facilitate an EBC to be deposited directly on the external surface 28. Typically a silicon metal bond coat is used between a CMC component and an EBC. The methods described herein may create an in situ grown bond coat with the outer region 14. The in situ grown bond coat allows for the deposition of the EBC without the step of depositing the silicon metal bond coat.

Figure 2:
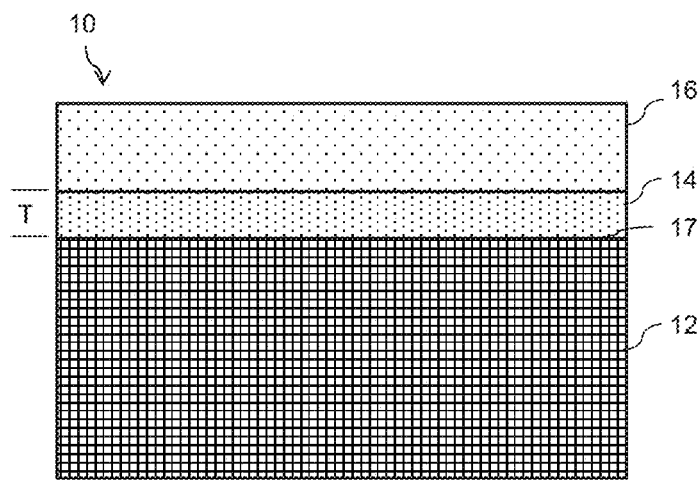
FIG. 2 is schematic of a SiC—SiC CMC that includes an environmental barrier coating (EBC) layer deposited on an in-situ grown outer region.

As shown in FIG. 2, the EBC 16 may be deposited in direct contact with the outer region 14. The EBC 16 may protect the component 10 from environmental attack of the harsh operating conditions which may enhance the life and efficiencies of the component 10. For example, a Si-based ceramic component 10 may be susceptible to water vapor damage without the addition of an EBC 16. The EBC 16 may be selected from a group consisting of mullite, barium strontinum aluminosilicate, strontinum aluminosilicate, barium aluminosilicate, rare earth disilicates, rare earth monosilicate, and any combination thereof. In some examples, an EBC 16 with a dense microstructure may have a porosity of less than about 20 vol. %, such as less than about 15 vol. %, less than 10 vol. %, or less than about 5 vol. %, where porosity is measured as a percentage of pore volume divided by total volume of the EBC 16.

Figure 3:
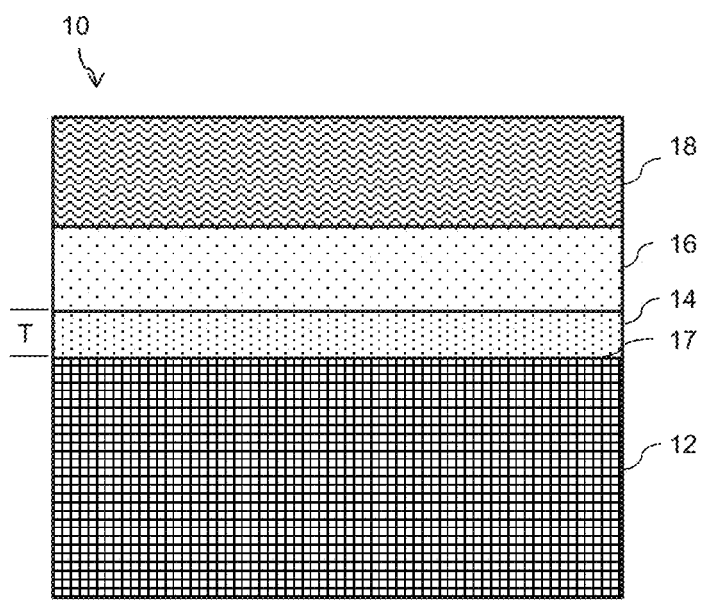
FIG. 3 is a schematic of a SiC—SiC CMC that includes an EBC layer sandwiched between an in-situ grown outer region and an abradable coating.

As shown in FIG. 3, an abradable coating 18 may be deposited in direct contact with the EBC 16. The abradable coating 18 may be bonded to the EBC 16 such that the EBC 16 is sandwiched between the outer region 14 and the abradable coating 18. The abradable coating 18 may be designed to interact with an abrasive coating applied to a rotating or moving component. The abradable coating may be designed to be worn away in a controlled manner during interaction with the abrasive coating 18 of the rotating component of the engine. The abradable coating 18 may be selected from a group consisting of barium strontinum aluminosilicate, strontinum aluminosilicate, barium aluminosilicate, rare earth disilicates, rare earth monosilicates, and combinations thereof.

The abradable coating 18 may be porous. In some examples, the abradable coating 18 may include porosity between about 10 vol. % and about 50 vol. %. In other examples, the abradable coating 18 may include porosity between about 15 vol. % and about 35 vol. %, or about 20 vol. %. Porosity of the abradable coating 18 is defined herein as a volume of pores or cracks in the abradable coating 18 divided by a total volume of the abradable coating 18 (including both the volume of material in the abradable coating 18 and the volume of pores/cracks in the abradable coating 18). The abradable coating 18 may be more porous than the EBC 16.

Figure 7:
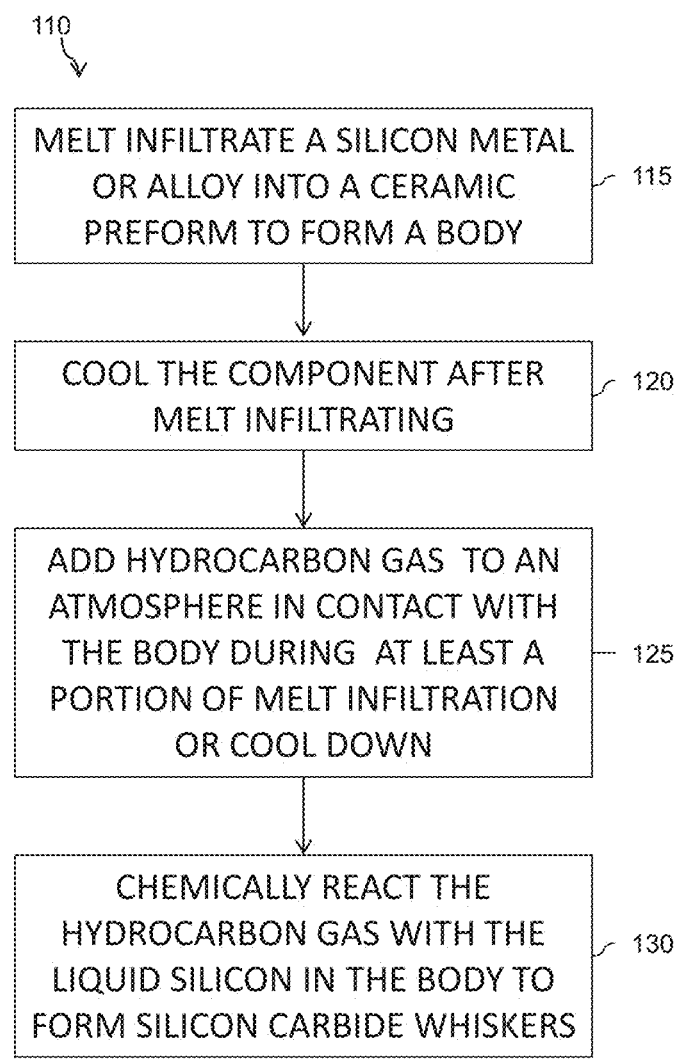
FIG. 7 is a block diagram depicting a method of modifying the atmosphere to form silicon carbide whiskers on an outer region of a SiC—SiC CMC.

One illustrative method 110, for forming a silicon rich outer region along a ceramic matrix composite component for use in a gas turbine engine is shown in FIG. 7. A CMC component, such as the component 10 in FIGS. 2 and 3, may be formed according to the method 110. Specifically the body 12 and the outer region 14 may be formed according to the method 110 described herein.

The process for making the body 12 and outer region 14 may begin with the fabrication of a two-dimensional or three-dimensional inorganic fiber preform, which may form a structural scaffold for subsequent incorporation of a ceramic matrix 20 and a molten alloy infiltrant. To make the inorganic fiber preform, chopped fibers, continuous fibers, woven fabrics, 3D woven preforms or combinations thereof are laid up, formed, fixed and shaped into the configuration of a desired component 10. The fibers in the inorganic fiber preform may be made from any inorganic material that is stable at processing temperatures above about 1000° C. and is compatible with the temperature of the molten alloy infiltrant. Suitable examples include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, pre-ceramic SiC fibers such as those available under the trade designation HI-NICALON and SYLRAMIC from COI Ceramics, Inc., San Diego, Calif.

In some examples, the inorganic fibers in the preform may be treated by applying a coating or coatings to, for example, provide a compliant layer at an interface between the fibers and the matrix 20. The coatings may be applied through a process of chemical vapor infiltration (CVI) or chemical vapor deposition (CVD). Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. If used, in various embodiments the fiber coating may have a thickness of about 0.05 μm to 15 μm, or about 0.1 μm to about 5 μm. In some embodiments, the CVI process may add contaminants or precipitants such as silicon carbide, metals, silicon borides, transition metal silicides or borides, metallic silicides or borides and any combination thereof.

Once the preform is shaped and rigidized, a matrix material may be incorporated into the preform. Methods for incorporating the matrix material may vary widely and include, for example, but are not limited to, injection molding, polymer infiltration and pyrolysis (PIP), slip casting, and infiltration methods (e.g., chemical vapor infiltration, slurry infiltration, melt infiltration and/or the like).

The process of slurry infiltration may include applying to the preform a slurry having dispersed therein particles including, but not limited to, ceramic materials. The slurry may flow into the interstices between the inorganic fibers of the preform, the particles in the slurry may substantially uniformly impregnate the pores of the preform and may come to reside in the interstices between the preform fibers.

In various embodiments, the particles in the slurry may include aluminum nitride, aluminum diboride, boron carbide, carbon, silicon carbide, silicon nitride, transition metal nitrides, transition metal borides, and mixtures and combinations thereof. In some embodiments, the slurry may also contain a reactive additive composed of a source of carbon such as graphite, carbon or diamond particulate, or a high char-yielding resin. In some embodiments, the slurry infiltration process may add contaminants or precipitates such as iron-rich silicides, silicon borides, transition metal borides or silicides and any combination thereof.

Following the steps of CVI and slurry infiltration the component 10 may undergo melt infiltration. The method 110 described herein modifies the step of melt infiltration. Specifically, as shown in FIG. 7, in step 115 of the method 110, the component 10 may undergo melt infiltration. Melt infiltration may follow the steps of CVD and slurry infiltration as described herein. A molten metal alloy infiltrant may be applied to the component 10. The metal alloy may include Si, B, Al, Y, Ti, Zr, and mixtures and combinations thereof. The molten metal alloy filler may gradually flow into and spreads throughout the component 10. In some embodiments, capillary action further draws the molten filler into the localized region of the green ceramic article until a desired portion of the component 10 is adequately densified with the metal alloy.

In step 120 and 125 of the method 110, hydrocarbon gas may be added to an atmosphere in contact with the body during at least a portion of the melt infiltrating, the cooling or any combination, as shown in FIG. 7. The modified environment may include the addition of hydrocarbon gases. Due to the high temperatures during melt infiltration the hydrocarbon gas addition may be accompanied by the addition of hydrogen in a ratio ranging from 4:1 and 1:20 to slow the deposition rate. The hydrocarbon gas may be selected from a group consisting of methane, propane, or the like.

In step 130 of the method 110, the hydrocarbon gas may chemically react with silicon in the body to form silicon carbide on an outer region of the body, as shown in FIG. 7. The hydrocarbon gases may be combined with liquid or vapor phase silicon or silicon alloy to form a silicon carbide network on the outer region 14 of the component 10. The reaction between the gas and the outer region 14 may result in various surface modifications. For example, the chemical reaction between the hydrocarbon gas with the silicon or liquid silicon in the outer region 14 of the body 12 of the component 10 may form silicon carbide whiskers 26. The silicon carbide whiskers 26 may be within the outer region 14 of the body 12 of the component 10. The whiskers 26 may be embedded in the matrix 20 or the whiskers 26 may grow out of the body 12. Precipitants and contaminates deposited in the matrix 20 during CVI and slurry infiltration may increase whisker growth. The precipitants or contaminates may act as catalysts in the reaction between the hydrocarbon gas and the liquid silicon. The contaminants or precipitants such as silicon carbide, metals, silicon borides, transition metal silicides or borides, metallic silicides or borides and any combination thereof. The catalyst may be added during the step of melt or slurry infiltration and may be selected from a group consisting of nickel, molybdenum, cobalt, or any combination thereof.

Figure 6:
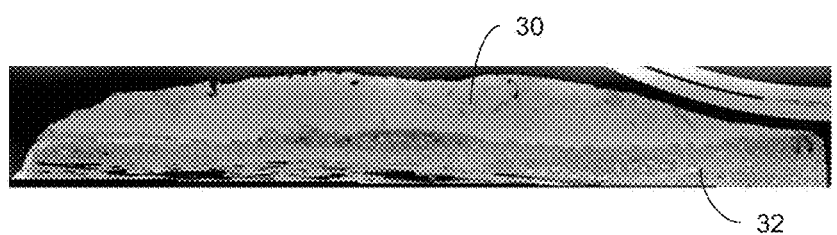
FIG. 6 is a micrograph depicting a metallographic section of a residual silicon nodule.

The liquid silicon metal or alloy may wet to the whiskers 26 of the outer region 14 of the body 12. The outer region 14 may form a strong bond to the body 12 due to being formed in situ during melt infiltration. The outer region 14 produced in-situ during melt infiltration may also have a lower residual stress than an outer region 14 produced by deposition. The whiskers 26 including a silicon carbide may enhance the strength of the coating and may cause a substantially flat external surface 28 to be formed for bonding additional layers. The substantially flat external surface 28 of the outer region 14 may be due to the wettability of the whiskers 26. Other methods may produce higher numbers of silicon metal nodules on the surface, but the high wettability of the whiskers along with the formation of a capillary network 26 may result in fewer silicon surface nodules, such as the silicon nodule 30 shown in FIG. 6. The silicon surface nodules 30 may result in areas of the surface of a body 32 with no silicon such as spaces or areas between the nodules 30. However, the methods describe herein may result in the outer region 14 substantially completely covering or coating the body 12. In particular, the whiskers 26 may cause the silicon metal to evenly distribute across the surface to form a substantially uniform silicon metal layer.

An EBC, such as the EBC described in FIGS. 2 and 3 may be applied directly to the in situ grown outer region 14 of the body 12. The EBC 16 may be added without a bond layer because the in situ grown outer region 14 of the body 12 is silicon rich and may form a strong bond with the EBC 16. In some examples, an EBC 16 may include an additive in addition to the primary constituents of the EBC 16. The additive may be added to the EBC 16 to modify one or more desired properties of the EBC 16. For example, the additive components may increase or decrease the reaction rate of the EBC 16 with calcia-magnesia-aluminosilicate (CMAS), and/or may modify the viscosity of the reaction product from the reaction of CMAS and the EBC 16. The EBC 16 may be deposited by a thermal spraying technique, such as, for example, plasma spraying.

An abradable coating, such as the abradable described herein and shown in FIG. 3, may be applied to the EBC 16. The abradable coating 18 may be deposited using, a thermal spraying technique, such as, for example, plasma spraying. Porosity of the abradable coating 18 may be controlled by the use of coating material additives and/or processing techniques to create the desired porosity. In some examples, substantially closed pores may be desired.

For example, a coating material additive that melts or burns at the use temperatures of the component 10 (e.g., a blade track) may be incorporated into the coating material that forms the abradable coating 18. The coating material additive may include, for example, a fugitive such as graphite, hexagonal boron nitride, or a polymer such as a polyester, or a combination thereof. The additive may be incorporated into the coating material. The additive then may be melted or burned off in a post-formion heat treatment, or during operation of the gas turbine engine, to form pores in the abradable layer. The post-deposition heat-treatment may be performed at up to about 1500° C.

In some embodiments, the body 12 and outer region 14 of the component 10 may be machined prior to depositing the EBC 16. Machining the composite article may include removing at least some of the external surface 28 including excess material to define a contact surface for contacting another component 10. The machining may include any type of mechanical machining, including, for example, milling, turning, shaping, planing, grinding, polishing, grit blasting, 3D interface machining, or the like. The machining may remove at least some of the excess material to reduce a dimension of the composite article and facilitate fit of the composite article with another component. The external surface 28 may include excess material which may reduce a chance that the machining exposes and/or damages reinforcement material in the underlying component.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method comprising:
   melt infiltrating a silicon metal or alloy into a ceramic preform to form a body;
   cooling the body after the melt infiltrating;
   adding hydrocarbon gas to an atmosphere in contact with the body during at least a portion of the melt infiltrating, the cooling or any combination thereof; and
   chemically reacting the hydrocarbon gas with silicon in the body to form silicon carbide on an outer region of the body, wherein the silicon carbide comprises whiskers.

2. The method of claim 1, further comprising wetting a silicon metal or alloy, formed from silicon of the body, to the whiskers to form the outer region, wherein the outer region has a silicon concentration greater than a silicon concentration of the body.

3. The method of claim 1, wherein the hydrocarbon gas is selected from the group consisting of methane, propane, or a combination thereof.

4. The method of claim 3, further comprising adding hydrogen gas to the step of adding hydrocarbon gas, wherein a ratio of hydrocarbon gas to hydrogen gas is between about 4:1 and about 1:20.

5. The method of claim 1, further comprising depositing an environmental barrier coating along an external surface of the outer region.

6. The method of claim 5, further comprising depositing a porous abradable on the environmental barrier coating such that the environmental barrier coating is sandwiched between the outer region and the porous abradable.

7. The method of claim 1, further comprising adding a catalyst comprising nickel, molybdenum, cobalt, or any combination thereof to the silicon metal or alloy during the step of melt infiltration.

8. A method comprising:
   melt infiltrating a silicon metal or alloy into a ceramic preform in the presence of a hydrocarbon gas in contact with the ceramic preform to form a body;
   chemically reacting the hydrocarbon gas with silicon in the body to form silicon carbide on an outer region of the body;
   wetting a silicon metal or alloy, formed from silicon of the body, to the silicon carbide to form the outer region, wherein the outer region has a silicon concentration greater than a silicon concentration of the body; and
   cooling the body.

9. The method of claim 8, wherein the silicon carbide on the outer region of the body comprises whiskers.

10. The method of claim 8, wherein the hydrocarbon gas is selected from the group consisting of methane, propane, or a combination thereof.

11. The method of claim 10, further comprising adding hydrogen gas to the step of adding hydrocarbon gas, wherein a ratio of hydrocarbon gas to hydrogen gas is between about 4:1 and about 1:20.

12. The method of claim 8, further comprising adding a catalyst comprising nickel, molybdenum, cobalt, or any combination thereof to the silicon metal or alloy during the step of melt infiltration.

13. A method comprising:
   melt infiltrating a silicon metal or alloy into a ceramic preform to form a body;
   cooling the body in the presence of a hydrocarbon gas in contact with the ceramic preform;
   chemically reacting the hydrocarbon gas with silicon in the body to form silicon carbide on an outer region of the body; and
   wetting a silicon metal or alloy, formed from silicon of the body, to the silicon carbide to form the outer region, wherein the outer region has a silicon concentration greater than a silicon concentration of the body.

14. The method of claim 13, wherein the silicon carbide on the outer region of the body comprises whiskers.

15. The method of claim 13, wherein the hydrocarbon gas is selected from the group consisting of methane, propane, or a combination thereof.

16. The method of claim 15, further comprising adding hydrogen gas to the step of adding hydrocarbon gas, wherein a ratio of hydrocarbon gas to hydrogen gas is between about 4:1 and about 1:20.

17. The method of claim 13, further comprising adding a catalyst comprising nickel, molybdenum, cobalt, or any combination thereof to the silicon metal or alloy during the step of melt infiltration.

* * * * *